US011153366B2

(12) United States Patent
Liu et al.

(10) Patent No.: US 11,153,366 B2
(45) Date of Patent: Oct. 19, 2021

(54) LIGHTWEIGHT WEB FONT CUSTOMIZATION INTEGRATED WITH GLYPH DEMANDING ASSESSMENT

(71) Applicant: International Business Machines Corporation, Armonk, NY (US)

(72) Inventors: Su Liu, Austin, TX (US); Boyi Tzen, Taipei (TW); Fan Yang, Beijing (CN); Debbie Anglin, Williamson, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 16/290,079

(22) Filed: Mar. 1, 2019

(65) Prior Publication Data
US 2020/0280602 A1    Sep. 3, 2020

(51) Int. Cl.
*H04L 29/08*    (2006.01)

(52) U.S. Cl.
CPC .............. *H04L 67/10* (2013.01); *H04L 67/02* (2013.01); *H04L 67/1002* (2013.01); *H04L 67/2814* (2013.01); *H04L 67/327* (2013.01)

(58) Field of Classification Search
CPC ....... H04L 67/10; H04L 67/02; H04L 67/327; H04L 67/1002; H04L 67/2814;
(Continued)

(56) References Cited

U.S. PATENT DOCUMENTS

| 4,881,069 A | 11/1989 | Kameda et al. |
| 7,222,306 B2 * | 5/2007 | Kaasila ..................... G09G 5/24 715/801 |

(Continued)

FOREIGN PATENT DOCUMENTS

| EP | 0170776 A2 | 2/1986 |
| EP | 1770640 A2 | 4/2007 |
| WO | 2013028842 A2 | 2/2013 |

OTHER PUBLICATIONS

Servati Beiragh, Soheil. "Hardware Accelerated Text Display." (2013). (Year: 2013).*

(Continued)

*Primary Examiner* — James N Fiorillo
(74) *Attorney, Agent, or Firm* — Cantor Colburn LLP; David Quinn (57) ABSTRACT

Systems, methods, and computer-readable media are described for generating a customized lightweight web font corresponding to web content and providing the lightweight font to a requesting client device to enable the client device to render the web content using the customized lightweight font. The customized lightweight font only includes glyphs corresponding to those characters that appear in the web content. The file size of the lightweight web font is substantially less than the file size of the complete web font, and thus, there is substantially less latency and overhead associated with downloading the lightweight web font as compared to downloading the entire web font. A glyph demanding assessment can be performed to identify a set of characters contained in the web content such that corresponding glyphs can be extracted from the web font and used to generate the customized lightweight web font.

17 Claims, 5 Drawing Sheets

(58) Field of Classification Search
CPC ..... H04L 12/5691; H04L 45/00; H04L 61/00; H04L 29/08; G06F 40/109; G06F 9/46; G06F 16/95; G06F 40/126; G06T 11/60; G06T 11/203
USPC ......... 709/217; 345/467, 636; 715/235, 269, 715/801
See application file for complete search history.

(56) References Cited

U.S. PATENT DOCUMENTS

| | | | |
|---|---|---|---|
| 8,769,405 B2 | 7/2014 | Bacus et al. | |
| 9,164,967 B2 | 10/2015 | Hughes et al. | |
| 9,164,968 B2 | 10/2015 | Stell | |
| 9,817,615 B2* | 11/2017 | Seguin | G06F 3/121 |
| 10,503,810 B2* | 12/2019 | Ellis | G06F 40/109 |
| 10,572,574 B2* | 2/2020 | Lee | G06F 40/109 |
| 2007/0070071 A1* | 3/2007 | Terazono | G06T 9/20 345/467 |
| 2008/0306916 A1* | 12/2008 | Gonzalez | G06F 16/93 |
| 2011/0090230 A1* | 4/2011 | Bacus | G06F 40/109 345/467 |
| 2011/0093565 A1* | 4/2011 | Bacus | G06F 40/154 709/219 |
| 2012/0001922 A1* | 1/2012 | Escher | G06F 40/109 345/467 |
| 2012/0079374 A1* | 3/2012 | Gaddis | G06F 16/9577 715/269 |
| 2014/0047329 A1 | 2/2014 | Levantovsky et al. | |
| 2014/0115453 A1 | 4/2014 | Lee | |
| 2014/0136957 A1* | 5/2014 | Kaasila | G06F 40/109 715/235 |
| 2014/0176563 A1* | 6/2014 | Kaasila | G06F 40/109 345/467 |
| 2014/0225928 A1* | 8/2014 | Konnola | G06T 11/60 345/636 |
| 2015/0128027 A1* | 5/2015 | Konnola | G06F 40/143 715/235 |
| 2015/0154152 A1* | 6/2015 | Konnola | G06F 40/109 715/269 |
| 2015/0161082 A1* | 6/2015 | Levien | G06F 16/93 715/235 |
| 2015/0178476 A1* | 6/2015 | Horton | G06F 40/109 726/26 |
| 2015/0348297 A1* | 12/2015 | Kaasila | G06F 16/51 345/467 |
| 2017/0199850 A1* | 7/2017 | Mishra | G06F 16/9574 |
| 2017/0237723 A1* | 8/2017 | Gupta | G06F 40/109 726/7 |
| 2017/0249286 A1* | 8/2017 | Kaplan | G09G 5/24 |

OTHER PUBLICATIONS

Servati Beiragh, Soheil. "Hardware Accelerated Text Display." (2013). (Year: 2013) (Year: 2013).*

"Web Fonts" MDN web docs—Mozilla <URL: https://developermozilla.org/en-US/docs/Learn/CSS/Styling_text/Web_fonts > Accessed: Jul. 15, 2020 (11 pages).

Gaultney et al., "Web Fonts and Reserved Font Names" SIL—Computers & Writing Systems <URL: http://scripts.sil.org/cms/scripts/page.php?site_id=nrsi&id=OFL_web_fonts_and_RFNs> May 15, 2013 (9 pages).

Toledo et al., "Font Subsetting and Downloading in the PostScript Printer Driver of Qt/X11" XFree86 Technical Conference, Nov. 5, 2001 (11 pages).

Grigorik "Optimize WebFont loading and rendering" Web.Dev—Google Developers, Aug. 16, 2019 (10 pages).

* cited by examiner

LIGHTWEIGHT WEB FONT CUSTOMIZATION INTEGRATED WITH GLYPH DEMANDING ASSESSMENT

BACKGROUND

The present invention relates generally web font customization, and more particularly, to lightweight web font customization integrated with glyph demanding assessment.

Web typography refers to the use of fonts on the World Wide Web. Web fonts may be downloaded from a remote server by a client such as a web browser such that text on a web page can be rendered in accordance with desired font styles. Current techniques for downloading web fonts and rendering web page text in accordance with the downloaded web fonts, however, suffer from a number of technical drawbacks, technical solutions to which are described herein.

SUMMARY

In one or more example embodiments, a computer-implemented method for reducing latency associated with downloading web fonts is disclosed. The method includes identifying a web font associated with a web page being accessed by a client device and determining a set of characters contained in web content of the web page. The method further includes extracting, from the identified web font, a set of glyphs corresponding to the set of characters and generating a customized lightweight web font containing only the set of glyphs. The method additionally includes providing the customized lightweight web font to the client device to enable rendering of the web content on the client device using the customized lightweight web font.

In one or more other example embodiments, a system for reducing latency associated with downloading web fonts is disclosed. The system includes at least one memory storing computer-executable instructions and at least one processor configured to access the at least one memory and execute the computer-executable instructions to perform a set of operations. The operations include identifying a web font associated with a web page being accessed by a client device and determining a set of characters contained in web content of the web page. The operations further include extracting, from the identified web font, a set of glyphs corresponding to the set of characters and generating a customized lightweight web font containing only the set of glyphs. The operations additionally include providing the customized lightweight web font to the client device to enable rendering of the web content on the client device using the customized lightweight web font.

In one or more other example embodiments, a computer program product for reducing latency associated with downloading web fonts is disclosed. The computer program product includes a non-transitory storage medium readable by a processing circuit, the storage medium storing instructions executable by the processing circuit to cause a method to be performed. The method includes identifying a web font associated with a web page being accessed by a client device and determining a set of characters contained in web content of the web page. The method further includes extracting, from the identified web font, a set of glyphs corresponding to the set of characters and generating a customized lightweight web font containing only the set of glyphs. The method additionally includes providing the customized lightweight web font to the client device to enable rendering of the web content on the client device using the customized lightweight web font.

In one or more example embodiments, a computer-implemented method for performing a glyph demanding assessment of web content is disclosed. The method includes scanning the web content to identify a set of characters contained in the web content, determining a set of attributes associated with the web content, and populating a data structure with the set of attributes. The method further includes iteratively populating the data structure with each identified character.

In one or more other example embodiments, a system for performing a glyph demanding assessment of web content is disclosed. The system includes at least one memory storing computer-executable instructions and at least one processor configured to access the at least one memory and execute the computer-executable instructions to perform a set of operations. The operations include scanning the web content to identify a set of characters contained in the web content, determining a set of attributes associated with the web content, and populating a data structure with the set of attributes. The operations further include iteratively populating the data structure with each identified character.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments relate to, among other things, devices, systems, methods, computer-readable media, techniques, and methodologies for generating a customized lightweight web font corresponding to web content and providing the lightweight font to a requesting client device to enable the client device to render the web content using the customized lightweight font. In example embodiments, as used herein, a font is a particular design of a type and may have various associated attributes such as size (e.g., 12 pt), weight (e.g., bolded), and so forth. Fonts that have similar type designs may be considered part of the same font family. A web font, as used herein, refers to a font that is specially tuned or created for rendering web content. In example embodiments, the customized lightweight font only includes glyphs corresponding to those characters that appear in the web content. As such, the file size of the customized lightweight web font is substantially less than the file size of the complete web font, and thus, downloading the customized lightweight web font to a client device introduces substantially less latency than downloading the entire web font. As a result, the overhead associated with downloading the customized lightweight web font to a client device is substantially reduced and corresponding web content can be rendered on the client device using the intended font style without disrupting the user experience. In example embodiments, a glyph demanding assessment can be performed to identify a set of characters contained in the web content (referred to at times herein as a set of demanded characters). A data structure can then be populated with data indicative of the identified set of demanded characters for the web content to enable corresponding glyphs to be extracted from the web font and used to generate the customized lightweight web font. Further, while some conventional web fonts include multiple font subsets (e.g., a font subset containing only Latin characters) such that only a particular subset needs to be downloaded if requested web content only includes characters in that subset, example embodiments provide a technical benefit over even these conventional web fonts because the customized lightweight font that is generated includes only glyphs corresponding to the specific characters in the web font, and thus, is substantially smaller in size than any such font subset.

Illustrative methods in accordance with example embodiments of the invention and corresponding data structures (e.g., program modules) for performing the methods will now be described. It should be noted that each operation of the method 300 and/or the method 400 may be performed by one or more of the program modules or the like depicted in FIG. 2 or FIG. 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
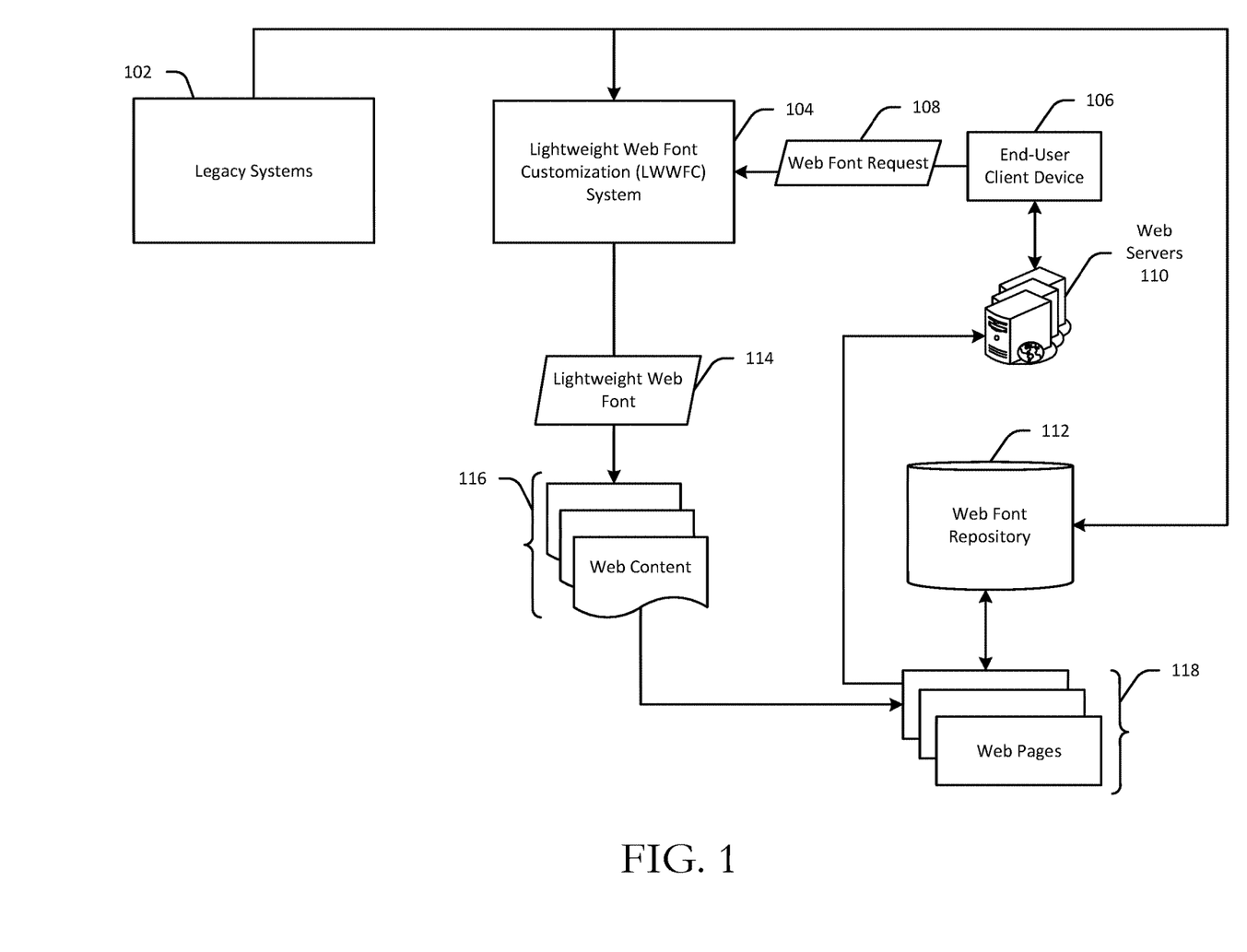
FIG. 1 is a schematic hybrid data flow/block diagram illustrating generation of a customized lightweight web font and redirection of a web font request to the lightweight web font to enable corresponding web content to be rendered on a client device using the lightweight web font in accordance with one or more example embodiments of the invention.

FIG. 1 is a hybrid data flow/block diagram illustrating various system components involved in the generation and/or use of a customized lightweight web font and their data flow interactions in accordance with example embodiments of the invention. FIG. 1 depicts a lightweight web font customization (LWWFC) system 104 configured to generate a customized lightweight web font 114. FIG. 1 also depicts legacy systems 102 which may include web servers, application servers, or the like. The legacy systems 102 may leverage the capabilities of the LWWFC system 104 or be integrated with the LWWFC system 104 to enable web content to be rendered on client devices using the customized lightweight web font 114.

The LWWFC system 104 may include one or more servers (e.g., the LWWFC server(s) 502 depicted in FIG. 5), which may be configured to provide the customized lightweight web font functionality as a Software-As-A-Service (SaaS) service (referred to hereinafter at times as the LWWFC service). In example embodiments, a web server 110 may be configured to make a call to the LWWFC service to enable the web provider to proactively generate one or more customized lightweight web fonts for each web page hosted by the web server 100. In other example embodiments, the LWWFC system 104 according to example embodiments of the invention may be integrated with one or more web servers. For instance, the LWWFC functionality may execute on one or more web servers 110. In yet other example embodiments, a web browser plug-in or the like may be installed on a client device, and the plug-in may be configured to call the LWWFC service to reactively generate customized lightweight web fonts as web pages are visited by the web browser. In still other example embodiments, a web page editor or word processor may be configured to call the LWWFC service to generate an embedded customized lightweight web font based on the edited web content. It still further other example embodiments, a cloud sharing agent may be configured to call the LWWFC service to generate embedded customized lightweight web fonts for users associated with the cloud sharing agent whose devices lack the appropriate web fonts to render various web content.

Figure 2:
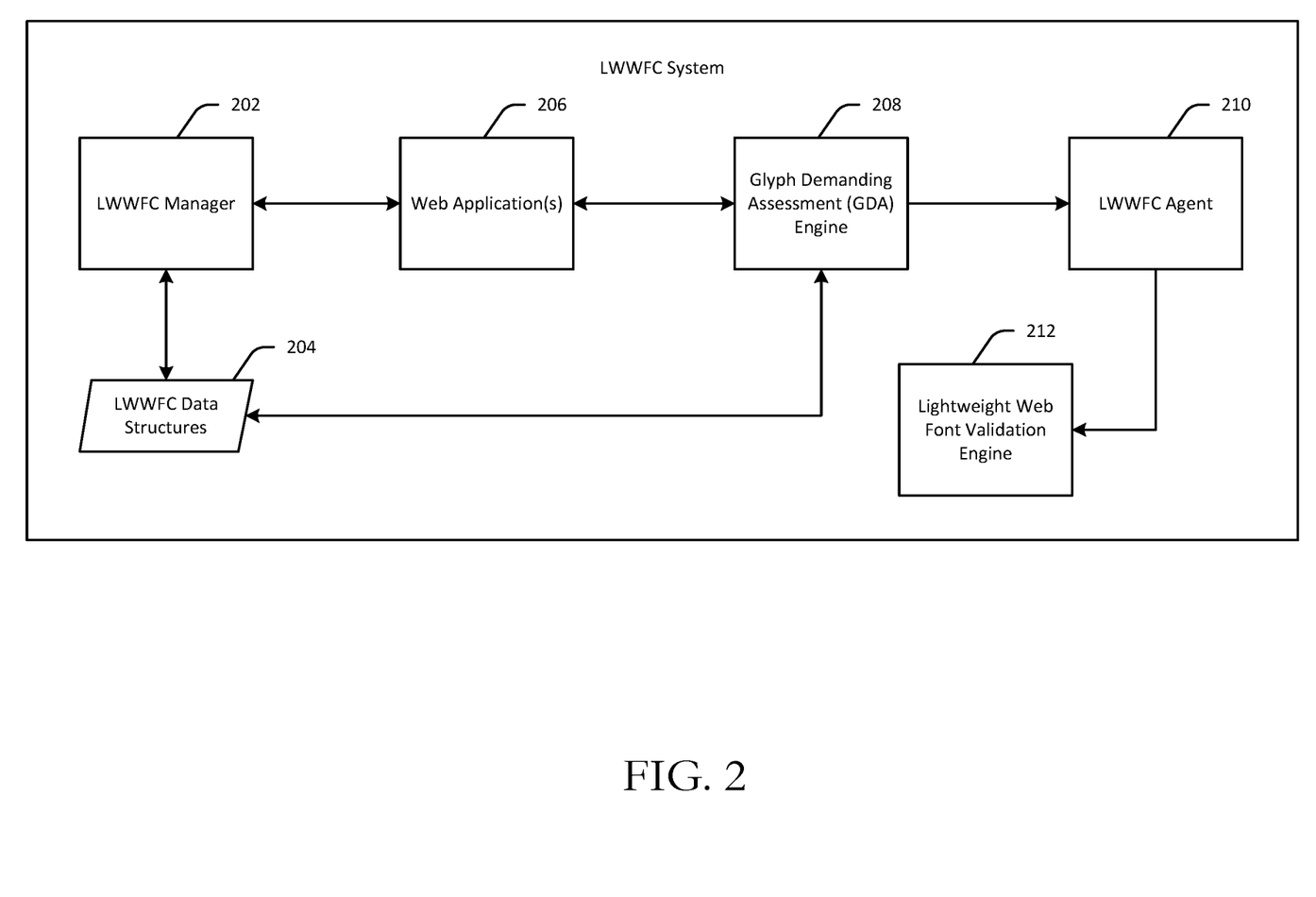
FIG. 2 is a schematic data flow/block diagram illustrating components of a lightweight web font customization system in accordance with one or more example embodiments of the invention.

Various exemplary components of the LWWFC system 104 are depicted in FIG. 2. For example, the LWWFC system 104 may include an LWWFC manager 202; a glyph demanding assessment (GDA) engine 208; an LWWFC agent 210; and a lightweight web font validation engine 212. In example embodiments, the LWWFC manager 202 is a user interface (UI) that can be employed to configure and manage new web fonts (e.g., the lightweight web font 114) from web fonts used on web pages. In example embodiments, the LWWFC manager 202 is capable of calling various font utility Application Programming Interfaces (APIs) to, for example, detect a web font used on a web page; detect a particular glyph used on a web page; select a web font; update a web font; create a web font; and so forth. In example embodiments, the LWWFC manager 202 is configured to call one or more APIs to leverage glyph demanding assessment functionality provided by the GDA engine 208.

In example embodiments, the LWWFC system 104 further includes one or more web applications 206. For instance, in certain example embodiments, a web browser plug-in or the like can be downloaded. The web browser plug-in may include or otherwise be configured to leverage various components of the LWWFC system 104 such as the LWWFC manager 202; the GDA engine 208; the LWWFC agent 210; and/or the lightweight web font validation engine 212. That is, in example embodiments, a client device may download a web browser plug-in or extension configured to call an LWWFC service executing on the LWWFC system 104. The LWWFC service may include functionality of the various above-referenced components of the LWWFC system 104. In these example embodiments, the glyph demanding assessment and lightweight web font generation and customization functionality—that is enabled by, for example, a client-side web browser plug-in or extension calling the LWWFC service—may be performed dynamically in real-time in association with a request for web content submitted by the web browser. In certain example embodiments, the glyph demanding assessment and lightweight web font generation and customization functionality provided by the LWWFC service may be provided as a subscription service or a pay-as-you-go service (e.g., based on the file size of the requested web content) to an end user.

In example embodiments, the LWWFC system 104 may further include LWWFC data structures 204. Each LWWFC data structure 204 may correspond to a particular web page, a particular section of a web page, or a collection of related web pages. For instance, an LWWFC data structure 204 may correspond to a collection of web pages, where each web page includes a hyperlink to another web page in the collection and/or is hyperlinked to by another web page in the collection. In example embodiments, an LWWFC data structure 204 includes data for defining, saving, and tracking web font usage associated with corresponding web page(s)/web content.

An exemplary LWWFC data structure 204 may include a web page identifier such as a uniform resource locator (url) that identifies a network location of a web page; a web section identifier that identifies a particular section of the web page; a web font identifier that identifies a web font for use in rendering web content corresponding to the web section identified by the web section identifier; a web font path identifier that indicates a network resource location from which the web font can be retrieved; a demanded character data structure that contains indicia of characters appearing in web content associated with the web section identified by the web section identifier; and so forth.

In certain example embodiments, a same web font may apply to all web content on a web page, in which case, a web section identifier may be absent from the LWWFC data structure 204, thereby indicating that the web font identified by the web font identifier is applicable to all sections of the web content. Further, in certain example embodiments, an LWWFC data structure 204 that corresponds to a web page may include multiple web section identifiers respectively corresponding to multiple sections of the web page as well as multiple web font identifiers indicating web fonts respectively corresponding to the web sections. In other example embodiments, if the same web font used across multiple web sections, multiple web section identifiers in an LWWFC data structure 204 may be linked to a particular web font identifier. In other example embodiments, a separate LWWFC data structure 204 may be generated and stored for each web section, and each section may indicate the web font to be used to render web content of that web section. In addition, in those example embodiments in which an LWWFC data structure 204 corresponds to a collection of web pages (e.g., a web site containing multiple hyperlinked web pages), the LWWFC data structure 204 may include multiple web page identifiers such as multiple urls respectively indicative of the multiple web pages.

In example embodiments, an LWWFC data structure 204 may be represented using any suitable data storage construct including, but not limited to, a list, a linked list, an array, a database table, or the like. Similarly, the demanded character data structure may be, without limitation, a list, an array, or the like. In example embodiments, the LWWFC manager 202 may be configured to access and update the LWWFC data structures 204. For instance, as web content is modified and/or web font associated with web content are modified, the user interface provided by the LWWFC manager 202 may enable corresponding updates to LWWFC data structures 204 to be made. Further, in example embodiments, the GDA engine 208 may be configured to access and update the LWWFC data structures 204 as well. In particular, as web content is modified, the GDA engine 208 may access and update corresponding LWWFC data structure(s) 204.

In example embodiments, the GDA engine 208 is configured to perform a glyph demanding assessment of web content. More specifically, the GDA engine 208 may be configured to scan web content associated with one or more web pages and determine the specific characters contained in the web content. Upon determining the characters that appear in the web content, the GDA engine 208 may access one or more LWWFC data structures 204 corresponding to the web content and populate the demanded character data structure(s) with indicia of the characters (e.g., their Unicode representations). In certain example embodiments, a separate demanded character data structure may be maintained for each web section(s) associated with a different web font. For instance, if the web content of multiple sections of a web page are to be rendered using the same web font, a single demanded character data structure may be populated with all characters appearing across all such web sections.

In example embodiments, the LWWFC agent 210 is configured to generate a customized lightweight web font containing only glyphs corresponding to characters in a demanded character data structure. For instance, upon receiving a redirected web font request for a web font to render web content, the LWWFC agent 210 may access the appropriate LWWFC data structure(s) 204 and corresponding demanded character data structure(s); ascertain the characters included in the demanded character data structure(s); determine the glyphs corresponding to the characters; and generate corresponding lightweight web font(s) that include only the glyphs corresponding to the characters in the demanded character data structure(s). In certain example embodiments, the LWWFC agent 210 may generate multiple customized lightweight web fonts for web content appearing on a web page. For instance, if the web page includes multiple web sections associated with different web fonts, the LWWFC agent 210 may generate a distinct lightweight web font for each web section based on the corresponding set of demanded characters appearing in the web content of that web section.

In example embodiments, the lightweight web font validation engine 212 is configured to validate any new customized lightweight web font that is generated. Validation may include, without limitation, ensuring that the lightweight web font can be used to render web content on a requesting client device. For instance, the lightweight web font validation engine 212 may validate that the client device's network bandwidth is sufficient to download the lightweight web font. As another non-limiting example, the lightweight web font validation engine 212 may validate that the lightweight web font can be loaded and utilized by client applications (e.g., a web browser) executing on a requesting client device.

Figure 3:
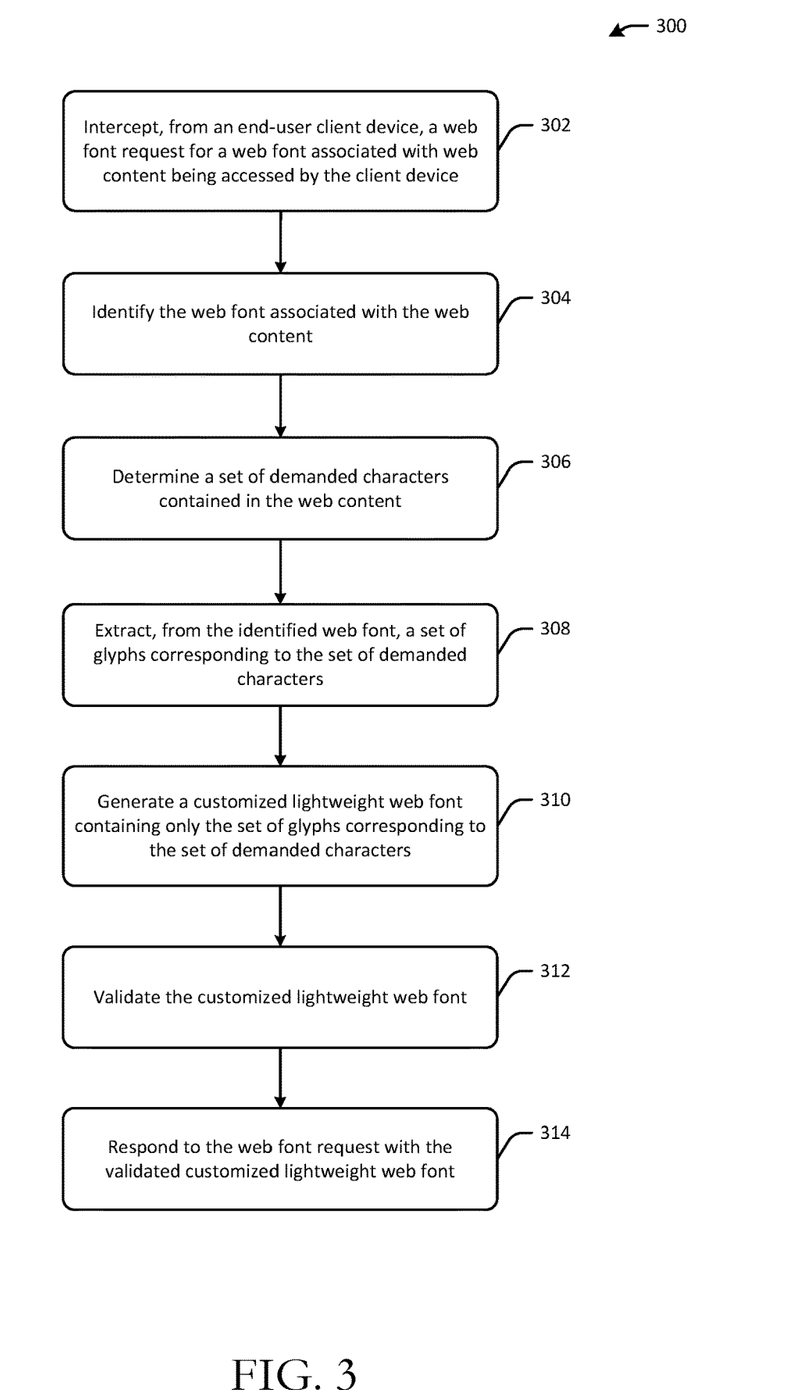
FIG. 3 is a process flow diagram of an illustrative method for intercepting a web font request from a client device, generating a customized lightweight web font corresponding to requested web content, and redirecting the web font request to the lightweight web font to enable the corresponding web content to be rendered on a client device using the lightweight web font in accordance with one or more example embodiments of the invention.

Referring now to FIG. 3 in conjunction with FIG. 1, at block 302 of the method 300, the LWWFC system 104 may intercept a web font request 108 from an end-user client device 106. The web font request 108 may be a request for a web font to render corresponding web content 116 that is being requested. While the example method 300 assumes that the web font request 108 corresponds to web content 116 to be rendered using a particular web font, it should be appreciated that the method 300 may be repeated with respect to each portion of requested web content (e.g., each web section of a web page) that is to be rendered using a different web font.

In example embodiments, the end-user client device 106 may submit a request for the web content 116 (e.g., a web page request) to one or more web servers 110. The web content 116 may be associated with one or more web pages 118. In connection with the web content request, the client device 106 may submit the web font request 108 to the web server(s) 110. Conventionally, the web font request 108 may be directed to a font server (which may be a web server) configured to access a web font repository 112 to retrieve the corresponding web font. File sizes for web fonts are typically quite large, and thus, there is typically a significant latency associated downloading a web font to a client device. Conventionally, client devices render web content using a default font until a web font is downloaded, at which point, the web content is then re-rendered using the downloaded web font. This is, however, disruptive to the user experience because web content rendered using the default font may not be displayed correctly on a client device (e.g., a mobile device); the default web font may not include glyphs for certain characters in the web content; and so forth. Further, this disruption to the user experience may be prolonged given the latency associated with downloading a web font, as described earlier.

Example embodiments of the invention provide a technical solution that addresses this technical problem associated with conventional web fonts by providing a mechanism whereby a customized lightweight web font 114 is generated that contains only glyphs of the web font that correspond to characters that appear in the requested web content and the web font request 108 is redirected to the LWWFC system 104 to provide the customized lightweight web font 114 to the client device 106 in response to the web font request 108. The customized lightweight web font 114 is substantially smaller in size than the complete corresponding web font, and thus, can be downloaded by the client device 106 in a substantially shorter period of time. As such, the web content can be rendered in real-time or near-real-time on the client device 106 using the correct and intended web font because all glyphs necessary to render the web content are included in the lightweight web font 114.

At block 304 of the method 300, the LWWFC agent 210 may identify the web font associated with the requested web content 116. In example embodiments, the LWWFC agent 210 locates the LWWFC data structure 204 corresponding to the web content 116 and identifies the corresponding web font based on a web font identifier included in the LWWFC data structure 204. For instance, assuming that the requested web content 116 is a section of content on a web page, the LWWFC agent 210 may access an LWWFC data structure 204 that includes a web section identifier corresponding to the section of web content on the web page. The LWWFC agent 210 may then determine the web font identifier stored in the LWWFC data structure 204 and linked to the web section identifier. The LWWFC agent 210 may then identify and access from the web font repository 112, the web font corresponding to the web font identifier.

At block 306 of the method 300, the LWWFC agent 210 may determine a set of demanded characters contained in the web content 116. More specifically, the LWWFC agent 210 may access an LWWFC data structure 204 corresponding to the requested web content and determine the set of demanded characters from the demanded character data structure included therein. The set of demanded characters includes only those characters appearing in the requested web content 116. Then, at block 308 of the method 300, the LWWFC agent 210 may extract, from the web font identified at block 304, only those glyphs that correspond to the characters in the set of demanded characters. Thus, in example embodiments, any glyph that corresponds to a character that does not appear in the requested web content 116 is not extracted at block 308.

At block 310 of the method 300, the LWWFC agent 210 may generate the customized lightweight web font 114 using only the glyphs extracted at block 308. In this manner, the customized lightweight web font 114 is much smaller in file size than the larger complete web font because the customized lightweight web font 114 includes only those glyphs that are necessary to render corresponding characters that appear in the requested web content 116.

At block 312 of the method 300, the lightweight web font validation engine 212 validates the customized lightweight web font 114. Validation may include, without limitation, ensuring that the lightweight web font 114 can be used to render the web content 116 on the requesting client device 106. For instance, the lightweight web font validation engine 212 may validate that the client device's 106 network bandwidth is sufficient to download the lightweight web font 114; that the lightweight web font 114 can be loaded and utilized by client applications (e.g., a web browser) executing on the client device; and so forth. After the lightweight web font validation engine 212 validates the lightweight web font 114, the LWWFC system 104 responds to the redirected web font request 108 by providing the validated customized lightweight web font 114 to the client device 106 such that the client device 106 can render the requested web content 116 using the lightweight web font 114. In certain example embodiments, the LWWFC system 104 provides a network resource identifier to the client device 106 that identifies a network resource location (e.g., the web font repository 112) from which the lightweight web font 114 can be downloaded.

In example embodiments, the customized lightweight web font 114 may be generated dynamically in response to the web font request 108 submitted by the client device 106. In other example embodiments, the customized lightweight web font 114 may be generated proactively and stored in the web font repository 112 such that the lightweight web font 114 is available for retrieval and download in response to the web font request 108. For instance, in example embodiments, a service provider that operates the LWWFC system 104 may contract with a third-party service to generate and store lightweight web fonts proactively. In those example embodiments in which customized lightweight web fonts are generated and stored proactively, the corresponding demanded character data structures may be periodically accessed to determine if any characters have been added and/or removed. If any character is determined to have been added or removed from a set of demanded characters, the corresponding lightweight web font may be updated accordingly.

In certain example embodiments, an end user's web searching/browsing history may be evaluated to predict web content that the end user is likely to access in the future. The LWWFC system 104 (or a contracted third-party service) may then proactively generate lightweight web fonts corresponding to the web content that the end user is predicted to access. Further, in example embodiments, relationships between web pages 118 may influence the manner in which lightweight web fonts are generated. For instance, if an end user accesses a first web page that includes a hyperlink to a second web page, one or more customized lightweight web fonts may be proactively generated and stored for the second web page based on a prediction that the end user is likely to access the second web page at some point in the future given the access to the first web page. In example embodiments, a score indicative of an end user's likelihood to access web content may be generated and compared to a threshold value to determine whether a customized lightweight web font should be proactively generated for the web content prior to the end user actually accessing the web content.

Figure 4:
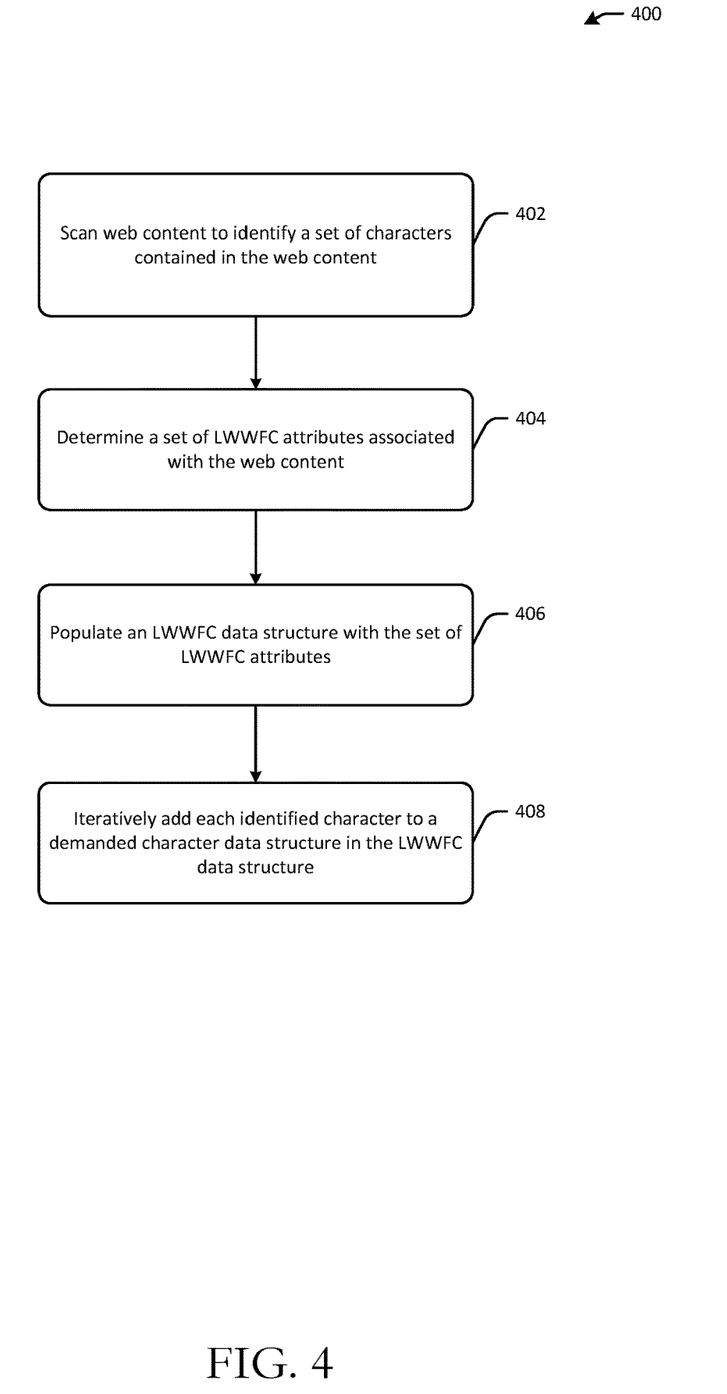
FIG. 4 is a process flow diagram of an illustrative method for performing a glyph demanding assessment of web content in accordance with one or more example embodiments of the invention.

FIG. 4 is a process flow diagram of an illustrative method 400 for performing a glyph demanding assessment of web content in accordance with one or more example embodiments of the invention. As with the generation of customized lightweight web fonts, the glyph demanding assessment performed in accordance with the example method 400 may be performed dynamically in response to the web font request 108 or statically (e.g., proactively). In those example embodiments in which the glyph demanding assessment is performed proactively, the assessment may be repeated periodically to update corresponding set(s) of demanded characters based on any modifications to the corresponding web content.

At block 402 of the method 400, the GDA engine 208 may scan web content to identify a set of characters contained in the web content. For simplicity, it is assumed that the web content scanned in example method 400 is content to be rendered using a particular web font. For instance, the web content may be one or more sections of content on a web page that are associated with the same web font. The example method 400 may be repeated with respect to web content associated with a different web font.

At block 404 of the method 400, the GDA engine 208 may determine a set of LWWFC attributes associated with the web content. The LWWFC attributes may include, for example, a web page identifier of a web page that includes the web content; a web section identifier of a section of the web page that includes the web content; a web font identifier corresponding to a web font to be used to render the web content; and so forth.

At block 406 of the method 400, the GDA engine 208 may populate an LWWFC data structure 204 with the LWWFC attributes determined at block 404. Finally, at block 408 of the method 400, the GDA engine 208 may iteratively add each identified character to a demanded character data structure in the LWWFC data structure 204. That is, in example embodiments, as each new character is identified in the scanned web content, a corresponding demanded character data structure in the LWWFC data structure 204 may be populated with an indicia of the identified character. In example embodiments, the web content may be periodically re-scanned, and if any modifications to the characters contained in the web content are identified, corresponding updates to the demanded character data structure may be made. In other example embodiments, each time a new web font request is received, the glyph demanding assessment may be performed again with respect to the corresponding web content.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 5:
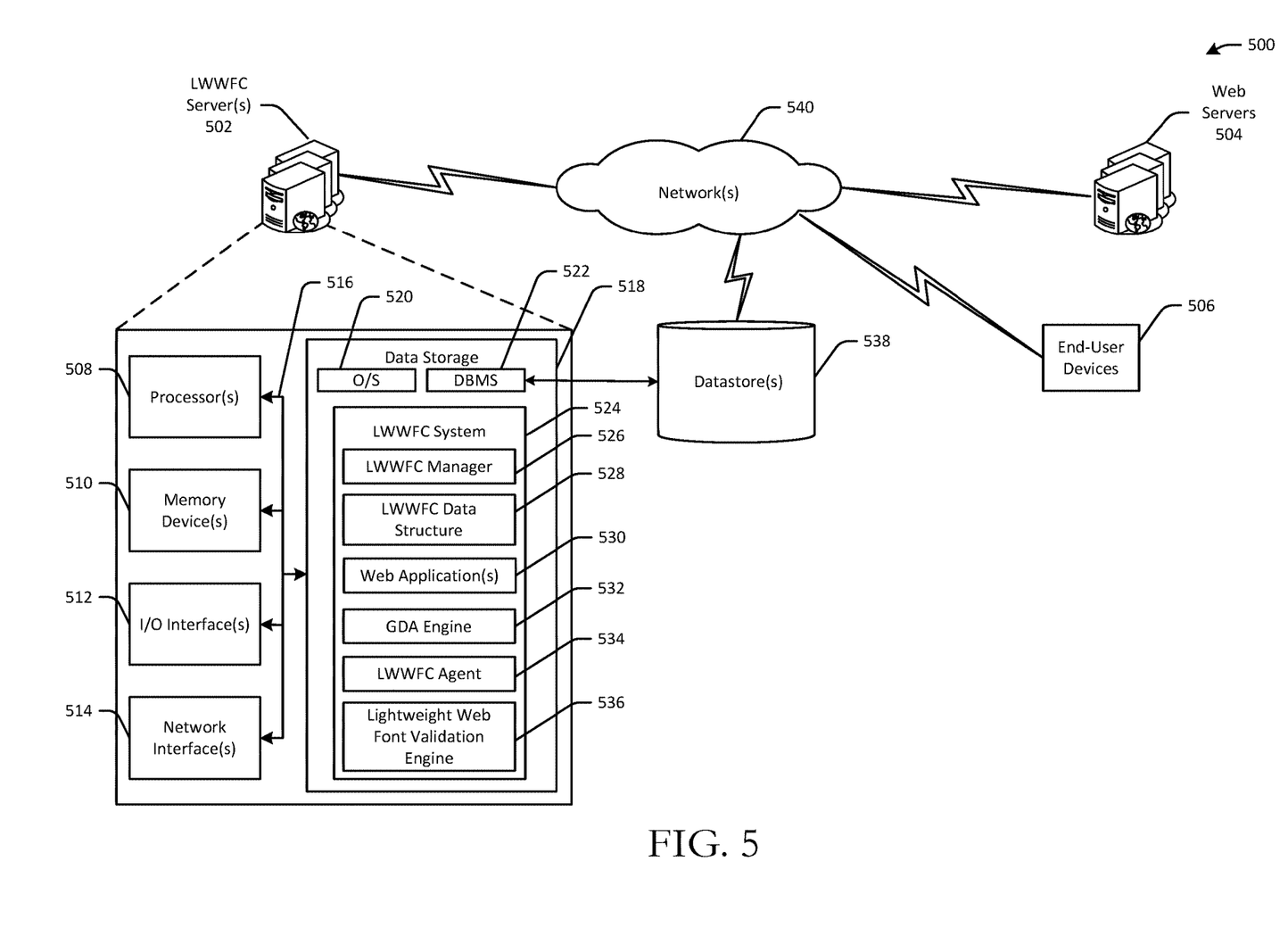
FIG. 5 is a schematic diagram of an illustrative networked architecture configured to implement one or more example embodiments of the invention.

FIG. 5 is a schematic diagram of an illustrative networked architecture 500 configured to implement one or more example embodiments of the invention. The illustrative networked architecture 500 includes one or more LWWFC servers 502 configured to communicate via one or more networks 540 with one or more web servers 504 and one or more end-user devices 506. The end-user devices 506 may include, without limitation, a personal computer (PC), a tablet, a smartphone, a wearable device, a voice-enabled device, or the like. While any particular component of the networked architecture 500 may be described herein in the singular, it should be appreciated that multiple instances of any such component may be provided, and functionality described in connection with a particular component may be distributed across multiple ones of such a component.

The network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 540 may have any suitable communication range associated therewith and may include, for example, global networks (e.g., the Internet), metropolitan area networks (MANs), wide area networks (WANs), local area networks (LANs), or personal area networks (PANs). In addition, the network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, an LWWFC server 502 may include one or more processors (processor(s)) 508, one or more memory devices 510 (generically referred to herein as memory 510), one or more input/output ("I/O") interface(s) 512, one or more network interfaces 514, and data storage 518. The LWWFC server 502 may further include one or more buses 516 that functionally couple various components of the LWWFC server 502.

The bus(es) 516 may include at least one of a system bus, a memory bus, an address bus, or a message bus, and may permit the exchange of information (e.g., data (including computer-executable code), signaling, etc.) between various components of the LWWFC server 502. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510 and may ultimately be copied to data storage 518 for non-volatile storage.

More specifically, the data storage 518 may store one or more operating systems (O/S) 520; one or more database management systems (DBMS) 522 configured to access the memory 510 and/or one or more external datastores 538; and an LWWFC system 524 that may include one or more program modules, applications, engines, managers, computer-executable code, scripts, computer-accessible/computer-executable data; or the like such as, for example, an LWWFC manager 526; LWWFC data structures 528; one or more web applications 530; a GDA engine 532; an LWWFC agent 534; and a lightweight web font validation engine 536. Any of the components depicted as being stored in data storage 518 may include any combination of software, firmware, and/or hardware. The software and/or firmware may include computer-executable instructions (e.g., computer-executable program code) that may be loaded into the memory 510 for execution by one or more of the processor(s) 508 to perform any of the operations described earlier in connection with correspondingly named modules/engines.

The data storage 518 may further various types of data (e.g., the LWWFC data structures 528) utilized by components of the LWWFC server 502. Any data stored in the data storage 518 may be loaded into the memory 510 for use by the processor(s) 508 in executing computer-executable instructions. In addition, any data stored in the data storage 518 may potentially be stored in the external datastore(s) 538 and may be accessed via the DBMS 522 and loaded in the memory 510 for use by the processor(s) 508 in executing computer-executable instructions.

The processor(s) 508 may be configured to access the memory 510 and execute computer-executable instructions loaded therein. For example, the processor(s) 508 may be configured to execute computer-executable instructions of the various program modules, applications, engines, managers, or the like of the LWWFC server 502 to cause or facilitate various operations to be performed in accordance with one or more embodiments of the invention. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the O/S 520 may be loaded from the data storage 518 into the memory 510 and may provide an interface between other application software executing on the LWWFC server 502 and hardware resources of the LWWFC server 502. More specifically, the O/S 520 may include a set of computer-executable instructions for managing hardware resources of the LWWFC server 502 and for providing common services to other application programs. In certain example embodiments, the O/S 520 may include or otherwise control the execution of one or more of the program modules, engines, managers, or the like depicted as being stored in the data storage 518. The O/S 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510, data stored in the data storage 518, and/or data stored in external datastore(s) 538. The DBMS 522 may use any of a variety of database models (e.g., relational model, object model, etc.) and may support any of a variety of query languages. The DBMS 522 may access data represented in one or more data schemas and stored in any suitable data repository. Data stored in the datastore(s) 538 may include, for example, LWWFC data structures 528; customized lightweight web fonts; complete web fonts; and so forth, any portion of which may alternatively or additionally be stored in the data storage 518. In example embodiments, the datastore(s) 538 include the web font repository 114 depicted in FIG. 1. External datastore(s) 538 that may be accessible by the LWWFC server 502 via the DBMS 522 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the LWWFC server 502, the input/output (I/O) interface(s) 512 may facilitate the receipt of input information by the LWWFC server 502 from one or more I/O devices as well as the output of information from the LWWFC server 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the LWWFC server 502 or may be separate. The I/O devices may further include, for example, any number of peripheral devices such as data storage devices, printing devices, and so forth.

The I/O interface(s) 512 may also include an interface for an external peripheral device connection such as universal serial bus (USB), FireWire, Thunderbolt, Ethernet port or other connection protocol that may connect to one or more networks. The I/O interface(s) 512 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The LWWFC server 502 may further include one or more network interfaces 514 via which the LWWFC server 502 may communicate with any of a variety of other systems, platforms, networks, devices, and so forth. The network interface(s) 514 may enable communication, for example, with one or more other devices via one or more of the network(s) 540.

It should be appreciated that the program modules/engines depicted in FIG. 5 as being stored in the data storage 518 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the LWWFC server 502 and/or other computing devices (e.g., one or more of the web server(s) 504) accessible via the network(s) 540, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the LWWFC server 502 may include alternate and/or additional hardware, software, or firmware components beyond those described or depicted without departing from the scope of the invention. More particularly, it should be appreciated that software, firmware, or hardware components depicted as forming part of the LWWFC server 502 are merely illustrative and that some components may not be present or additional components may be provided in various embodiments. While various illustrative modules have been depicted and described as software modules stored in data storage 518, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations the method 300 and/or the method 400 may be performed by one or more LWWFC servers 502 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 3 and 4 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for reducing latency associated with downloading web fonts, the method comprising:
   identifying at least one web font associated with a web page being accessed by a client device;
   determining a set of characters contained in web content of the web page;
   extracting, from the identified web font, a set of glyphs corresponding to the set of characters;
   generating a customized lightweight web font containing only the set of glyphs corresponding to only the set of set of characters contained in the web content of the web page;
   validating that the customized lightweight web font can be loaded on the client device;
   providing the customized lightweight web font to the client device to enable rendering of the web content on the client device using the customized lightweight web font; and
   upon identifying at least another web font associated with the web page being accessed by the client device, repeating the method for the at least another web font,
   wherein determining the set of characters comprises dynamically scanning the web content to identify the set of characters in response to a web font request from the client device, and
   wherein validating the customized lightweight web font comprises determining at least one of whether the client device has sufficient bandwidth to download the customized lightweight web font, and whether the customized lightweight web font can be loaded and utilized by a web browser executing on the client device.

2. The computer-implemented method of claim 1, wherein determining the set of characters comprises accessing a data structure populated with data indicative of the set of characters.

3. The computer-implemented method of claim 2, wherein the data structure further comprises an identifier of the web page and an identifier of the web font.

4. The computer-implemented method of claim 1, further comprising:
   intercepting, from the client device, a web font request for the web font; and
   storing the customized lightweight web font in a web font repository,
   wherein providing the customized lightweight web font to the client device comprises redirecting the web font request to the web font repository to enable retrieval of the stored customized lightweight web font.

5. A system for reducing latency associated with downloading web fonts, the system comprising:
   at least one processor; and
   at least one memory storing computer-executable instructions, wherein the at least one processor is configured to access the at least one memory and execute the computer-executable instructions to:
   identifying at least one web font associated with a web page being accessed by a client device;
   determining a set of characters contained in web content of the web page;
   extracting, from the identified web font, a set of glyphs corresponding to the set of characters;
   generating a customized lightweight web font containing only the set of glyphs corresponding to only the set of set of characters contained in the web content of the web page;
   validating that the customized lightweight web font can be loaded on the client device;
   providing the customized lightweight web font to the client device to enable rendering of the web content on the client device using the customized lightweight web font, and
   upon identifying at least another web font associated with the web page being accessed by the client device, repeating the method for the at least another web font,
   wherein the at least one processor is configured to determine the set of characters by executing the computer-executable instructions to dynamically scan the web content to identify the set of characters in response to a web font request from the client device, and
   wherein validating the customized lightweight web font comprises determining at least one of whether the client device has sufficient bandwidth to download the customized lightweight web font, and whether the customized lightweight web font can be loaded and utilized by a web browser executing on the client device.

6. The system of claim 5, wherein the at least one processor is configured to determine the set of characters by executing the computer-executable instructions to access a data structure populated with data indicative of the set of characters.

7. The system of claim 6, wherein the data structure further comprises an identifier of the web page and an identifier of the web font.

8. The system of claim 5, wherein the at least one processor is further configured to execute the computer-executable instructions to:
   intercept, from the client device, a web font request for the web font; and
   store the customized lightweight web font in a web font repository,
   wherein the at least one processor is configured to provide the customized lightweight web font to the client device by executing the computer-executable instructions to redirect the web font request to the web font repository to enable retrieval of the stored customized lightweight web font.

9. A computer program product for reducing latency associated with downloading web fonts, the computer program product comprising a storage medium readable by a processing circuit, the storage medium storing instructions executable by the processing circuit to cause a method to be performed, the method comprising:
   Identifying at least one web font associated with a web page being accessed by a client device;
   determining a set of characters contained in web content of the web page;
   extracting, from the identified web font, a set of glyphs corresponding to the set of characters;
   generating a customized lightweight web font containing only the set of glyphs corresponding to only the set of set of characters contained in the web content of the web page;
   validating that the customized lightweight web font can be loaded on the client device;
   providing the customized lightweight web font to the client device to enable rendering of the web content on the client device using the customized lightweight web font, and
   upon identifying at least another web font associated with the web page being accessed by the client device, repeating the method for the at least another web font, wherein determining the set of characters comprises dynamically scanning the web content to identify the set of characters in response to a web font request from the client device, and wherein validating the customized lightweight web font comprises determining at least one of whether the client device has sufficient bandwidth to download the customized lightweight web font, and whether the customized lightweight web font can be loaded and utilized by a web browser executing on the client device.

10. The computer program product of claim 9, wherein determining the set of characters comprises accessing a data structure populated with data indicative of the set of characters.

11. The computer program product of claim 10, wherein the data structure further comprises an identifier of the web page and an identifier of the web font.

12. The computer program product of claim 9, the method further comprising:
intercepting, from the client device, a web font request for the web font; and
storing the customized lightweight web font in a web font repository,
wherein providing the customized lightweight web font to the client device comprises redirecting the web font request to the web font repository to enable retrieval of the stored customized lightweight web font.

13. A computer-implemented method for performing a glyph demanding assessment of web content, the method comprising:
scanning the web content to identify a set of characters contained in the web content;
determining a set of attributes associated with the web content, the attributes including a web font identifier corresponding to a web font to be used to render the web content;
populating a data structure with the set of attributes;
iteratively populating the data structure with each identified character contained in the web content; and
generating a customized lightweight web font containing only the set of glyphs corresponding to only the set of set of characters contained in the web content, and
upon receiving a web font request from a client device, retrieving the customized lightweight web font, and validating that the customized lightweight web font can be loaded on the client device prior to providing the customized lightweight web font to the client device,
wherein the web content is scanned statically and the data structure is populated prior to receipt of a request for a web page containing the web content and the attributes,
wherein the customized lightweight web font is stored in a web font repository and is associated with the web font identifier corresponding to the web font used to render the web content, and
wherein validating the customized lightweight web font comprises determining at least one of whether the client device has sufficient bandwidth to download the customized lightweight web font, and whether the customized lightweight web font can be loaded and utilized by a web browser executing on the client device.

14. The computer-implemented method of claim 13, wherein scanning the web content comprises scanning the web content dynamically in response to a request for a web page containing the web content.

15. The computer-implemented method of claim 13, wherein the set of attributes comprises an identifier of a web page containing at least a portion of the web content and an identifier of a web font associated with the web content, and wherein iteratively populating the data structure with each identified character comprises iteratively adding each identified character to a list of characters in the data structure.

16. A system for performing a glyph demanding assessment of web content, the system comprising: at least one processor; and
at least one memory storing computer-executable instructions, wherein the at least one processor is configured to access the at least one memory and execute the computer-executable instructions to:
scan the web content to identify a set of characters contained in the web content;
determine a set of attributes associated with the web content, the attributes including a web font identifier corresponding to a web font to be used to render the web content;
populate a data structure with the set of attributes;
iteratively populate the data structure with each identified character contained in the web content;
generating a customized lightweight web font containing only the set of glyphs corresponding to only the set of set of characters contained in the web content, and
upon receiving a web font request from a client device, retrieving the customized lightweight web font, and validating that the customized lightweight web font can be loaded on the client device prior to providing the customized lightweight web font to the client device,
wherein the web content is scanned statically and the data structure is populated prior to receipt of a request for a web page containing the web content and the attributes,
wherein the customized lightweight web font is stored in a web font repository and is associated with the web font identifier corresponding to the web font used to render the web content, and
wherein validating the customized lightweight web font comprises determining at least one of whether the client device has sufficient bandwidth to download the customized lightweight web font, and whether the customized lightweight web font can be loaded and utilized by a web browser executing on the client device.

17. The system of claim 16, wherein the at least one processor is configured to scan the web content by executing the computer-executable instructions to scan the web content dynamically in response to a request for a web page containing the web content.

* * * * *